(12) United States Patent
Bond et al.

(10) Patent No.: US 10,012,177 B2
(45) Date of Patent: Jul. 3, 2018

(54) ENGINE COMPRISING A ROCKET COMBUSTION CHAMBER AND A HEAT EXCHANGER

(71) Applicant: Reaction Engines Ltd, Abingdon (GB)

(72) Inventors: Alan Bond, Abingdon (GB); Richard Varvill, Abingdon (GB)

(73) Assignee: Reaction Engines Ltd, Abingdon (GB)

( * ) Notice: Subject to any disclaimer, the term of this patent is extended or adjusted under 35 U.S.C. 154(b) by 607 days.

(21) Appl. No.: 14/296,620

(22) Filed: Jun. 5, 2014

(65) Prior Publication Data

US 2015/0101308 A1 Apr. 16, 2015

(30) Foreign Application Priority Data

Oct. 11, 2013 (GB) .................................. 1318108.6

(51) Int. Cl.
| | | |
|---|---|---|
| *F02K 9/78* | (2006.01) | |
| *F02K 9/64* | (2006.01) | |
| *F02C 7/143* | (2006.01) | |
| *F02C 7/18* | (2006.01) | |

(52) U.S. Cl.
CPC .................. *F02K 9/78* (2013.01); *F02K 9/64* (2013.01); *F02C 7/143* (2013.01); *F02C 7/185* (2013.01)

(58) Field of Classification Search
CPC .. F02C 7/143; F02C 7/185; F02K 9/42; F02K 9/48; F02K 9/64; F02K 9/78
See application file for complete search history.

(56) References Cited

U.S. PATENT DOCUMENTS

| | | | | |
|---|---|---|---|---|
| 3,389,555 A | * | 6/1968 | Goldstein | ................. F02K 7/08 60/257 |
| 3,452,541 A | * | 7/1969 | Builder | ................... F02C 7/143 60/257 |
| 3,516,254 A | * | 6/1970 | Hammond | ................ F02K 9/48 192/89.1 |

(Continued)

FOREIGN PATENT DOCUMENTS

| | | |
|---|---|---|
| CN | 1343282 A | 4/2002 |
| CN | 101149028 A | 3/2008 |

(Continued)

OTHER PUBLICATIONS

Jivraj, F. et al., "The Scimitar Precooled Mach 5 Engine", 2nd European Conference for Aerospace Sciences (EUCASS), Brussels, Belgium, Jul. 2007, pp. 1-10.*

(Continued)

*Primary Examiner* — Lorne Meade
(74) *Attorney, Agent, or Firm* — Covington & Burling LLP; Andrea G. Reister; Melody Wu

(57) ABSTRACT

The present disclosure relates to an engine having two modes of operation—air breathing and rocket—that may be used in aerospace applications such as in an aircraft, flying machine, or aerospace vehicle. The engine's efficiency can be maximized by using a precooler arrangement to cool intake air in air breathing mode using cold fuel used for the rocket mode. By introducing the precooler and certain other engine cycle components, and arranging and operating them as described, problems such as those associated with higher fuel and weight requirements and frost formation can be alleviated.

12 Claims, 5 Drawing Sheets

(56) References Cited

U.S. PATENT DOCUMENTS

| | | | | |
|---|---|---|---|---|
| 3,561,217 | A * | 2/1971 | Hall | F17C 9/04 60/204 |
| 3,638,719 | A * | 2/1972 | McGann | F02C 7/05 60/267 |
| 3,740,949 | A * | 6/1973 | Wolf | F02C 7/08 60/267 |
| 3,747,339 | A * | 7/1973 | Wolf | F02C 7/08 60/206 |
| 3,775,977 | A * | 12/1973 | Builder | F02K 7/08 60/260 |
| 4,513,572 | A * | 4/1985 | Bonnaud | F01K 23/065 60/618 |
| 4,771,601 | A * | 9/1988 | Spies | F02K 7/18 60/259 |
| 5,025,623 | A * | 6/1991 | Hirakoso | F02K 9/42 60/257 |
| 5,097,896 | A * | 3/1992 | Belcher | F28D 7/08 165/140 |
| 5,101,622 | A | 4/1992 | Bond | |
| 6,808,145 | B2 * | 10/2004 | Burton | B64G 1/401 244/171.1 |
| 6,938,417 | B2 * | 9/2005 | Watanabe | F02C 6/18 60/39.182 |
| 6,981,364 | B2 | 1/2006 | Okamoto et al. | |
| 7,418,814 | B1 | 9/2008 | Greene | |
| 7,784,296 | B2 | 8/2010 | Chen et al. | |
| 2011/0220317 | A1 * | 9/2011 | Kidwell | F24J 3/083 165/11.1 |

FOREIGN PATENT DOCUMENTS

| | | | |
|---|---|---|---|
| GB | 1392675 A | 4/1975 | |
| GB | 2223809 A | 4/1990 | |
| GB | 2356224 A | 5/2001 | |
| WO | WO-00/57048 A2 | 9/2000 | |
| WO | WO2013027186 A2 * | 2/2013 | H01L 31/052 |

OTHER PUBLICATIONS

Varvill, R., and Bond, A., "The Skylon Spaceplane: Progress to Realisation", Journal of the British Interplanetary Society (JBIS), vol. 61, 2008, pp. 412-418.*

Varvill, R., and Bond, A., "A Comparison of Propulsion Concepts for SSTO Reusable Launchers", Journal of the British Interplanetary Society (JBIS), vol. 56, 2003, pp. 108-117.*

Skylon Assessment Report, European Space Research and Technology Centre (ESTEC), TEC-MPC/2011/946/MF, Issue 1, Rev. 2, May 6, 2011, pp. 1-52.*

PCT International Search Report (PCT Article 18 and Rules 43 and 44) for PCT/GB2014/000409, dated Feb. 11, 2015.

PCT Written Opinion of the International Searching Authority (PCT Rule 43bis.1) for PCT/GB2014/000409, dated Feb. 11, 2015.

Varvill et al., "The SKYLON Spaceplane," 57 J. Brit. Interplanetary Soc. 22-32 (2003).

UK Intellectual Property Office Search Report for Ser. No. GB1318108.6 dated May 13, 2014.

* cited by examiner

ENGINE COMPRISING A ROCKET COMBUSTION CHAMBER AND A HEAT EXCHANGER

CROSS-REFERENCE TO RELATED APPLICATIONS

The present application claims priority under 35 U.S.C. § 119(a) to the following application filed in the United Kingdom on Oct. 11, 2013, which is incorporated herein by reference: GB 1318108.6.

FIELD

The present disclosure relates to an engine such as of the type which may be used in aerospace applications. The disclosure also relates to a method of operating such an engine as well as an aircraft, flying machine or aerospace vehicle including such an engine.

BACKGROUND

Attempts have been made to produce a single stage to orbit (SSTO) vehicle. In order to be commercially viable, such a vehicle would generally require a high payload fraction in order that it may be adapted to meet different operational requirements. In addition, such a vehicle would be readily ground maneuverable and have a short maintenance turnaround cycle.

It is theoretically possible to realize an SSTO with high performance rocket propulsion. However, to use a rocket from take-off would necessitate a high payload of an oxidant, e.g. liquid oxygen, which would add considerable mass to the vehicle. One option is to augment the rocket engine with an alternative power propulsion unit and then to complete the ascent into orbit on rocket propulsion alone.

GB-A-2240815 describes a dual-mode or hybrid aerospace propulsion engine. In this engine, in a first mode of operation, the engine employs liquid hydrogen fuel to pre-cool the intake air of a turbo-compressor in order to deliver it, at high pressure, as oxidizer, to a rocket type combustor/nozzle assembly. At high Mach numbers, e.g. in excess of Mach 5, the engine changes to a second mode of operation which operates as a conventional high performance rocket engine using liquid oxygen carried on the vehicle to oxidize the liquid hydrogen fuel.

Such a hybrid engine can serve to extend the performance of the rocket engine by adding air breathing capability to it. Rocket engines are considered to be the most appropriate engine for achieving the necessary velocity to achieve orbit, for example, with an effective vacuum exhaust velocity ($V_{ef}$) of about 4500 m/s.

In order that a common combustion and nozzle system can be employed in both propulsion modes (i.e. rocket and air-breathing modes), inlet air must typically be compressed to high pressure similar to, but not necessarily identical with, that in rocket operation (approximately 150 bar). In order to do this, the inlet air is first cooled, to keep the delivery temperature within practical limits (below 800K) and to minimize the compressor work required of the turbo-compressor.

However, such an engine can be difficult to control. The present disclosure seeks to alleviate, at least to a certain degree, the problems and/or address at least to a certain extent, the difficulties associated with the prior art.

SUMMARY

According to a first aspect of the disclosure, there is provided an engine comprising: a rocket combustion chamber for the combustion of fuel and oxidant; a compressor for supplying pressurized oxidant to said combustion chamber; a first heat exchanger having an inlet and an outlet arranged for cooling oxidant to be supplied to said compressor using a heat transfer medium before compression by said compressor; a heat transfer medium loop for said heat transfer medium; a fuel delivery arrangement for delivering fuel; a second heat exchanger arranged for cooling of said heat transfer medium by fuel delivered by said fuel delivery arrangement; a first circulator for circulating said heat transfer medium around said heat transfer medium loop and delivering said heat transfer medium to said inlet of said first heat exchanger; a second circulator arranged downstream of said outlet of said first heat exchanger; said engine being configured to operate in a first operating mode, in which said second circulator is configured to deliver heat transfer medium from the outlet of said first heat exchanger to the inlet of said first heat exchanger.

In this way, the heat transfer medium can be recirculated back into the first heat exchanger, without being first cooled by the fuel in order to regulate and control the temperature of the first heat exchanger. This can help to control frost formation on the first heat exchanger and allows for a satisfactory use of fuel.

The combustion chamber may be connected to a nozzle to provide thrust. The combustion chamber and/or nozzle may be air cooled.

The engine may be configured as a propulsion unit, for example for an aircraft or other such vehicle.

The heat transfer medium or fluid may usefully also serve as a working fluid, i.e. it is capable of being expanded and compressed. This fluid may be used in the power loop of the engine, e.g. to drive turbines.

Although reference has been made in this specification to turbines and compressors, any suitable machinery may be employed which may be driven by the working fluids or which may compress the working fluid. As such, references to turbines should be understood to include any machine which may be driven by a fluid, e.g. a gas and reference to compressors should be understood to mean any machine which can compress a fluid.

The compressor may be part of an axial turbocompressor. The compressor may be configured to have a compression ratio of 150:1. Air may be compressed in the compressor. The outlet pressure of air may be 145 bar.

The fuel delivery may be from a cryogenic fuel store.

Optionally, the engine further comprising: a third heat exchanger, the third heat exchanger being arranged for cooling said heat transfer medium from the outlet of the first heat exchanger using said fuel; and wherein the engine is configured to operate in a second operating mode, in which the second circulator is configured to deliver heat transfer medium from the outlet of the first heat exchanger to an intermediate point between the inlet and outlet of the first heat exchanger after cooling by said third heat exchanger.

Optionally, the engine further comprises a bypass which can be employed for bypassing fuel past said third heat exchanger in said first operating mode.

Valves may be provided to operate the bypass. The proportion of heat transfer medium from the first heat exchanger outlet may be adjusted to control the temperature distribution in the first heat exchanger.

The first heat exchanger may have a plurality of stages. The heat exchanger may comprises a plurality of thin walled tubes. The tubes may be nested.

The engine may be provided with one or more bypass burners. At low flows of inlet oxidant, for example when a vehicle incorporating such an engine is travelling at low velocities, more oxidant than needed is supplied. The bypass burners may be switched off, e.g. fuel is not supplied to the bypass burners. The bypass burners may be controlled down or up to match the oxidant, e.g. air supply to the engine. The bypass burners can provide additional thrust.

Optionally, the engine further comprises a turbine, the turbine being configured to be driven using a portion of heat transfer medium from the outlet of the first heat exchanger for driving said compressor.

Optionally, the engine further comprises a fourth heat exchanger configured for heating said heat transfer medium before delivery to said turbine.

Optionally, the engine comprises a pre-burner configured to pre-heat fuel before delivery to said rocket combustion chamber, an exhaust from said pre-burner being connected to said fourth heat exchanger for heating of said heat transfer medium.

The supply of fuel and oxidant to the pre-burner may be configured to maintain a substantially constant temperature of the heat transfer medium after exit from the fourth heat exchanger when the engine is operating in the first and second modes.

Optionally, the engine further comprises an oxidant store, said engine being configured to operate in a third operating mode, wherein said oxidant is supplied from said oxidant store.

In this third mode, the oxidant may be solely supplied from the oxidant store. The compressor may be bypassed.

In the third mode, the heat transfer medium may be used to drive a turbine coupled with a oxidant supply pump.

The first and second circulators may be provided as compressors, optionally with radial blades. The maximum power output of the first circulator may be greater than the maximum power output of the second circulator. The first and second circulators may be driven by turbines driven by the fuel supply.

The fuel delivery arrangement may comprise a fuel pump driven by a turbine.

Optionally, the engine is configured such that the heat transfer medium bypasses the first heat exchanger.

Optionally, the engine is configured such that the heat transfer medium bypasses the first circulator and is driven in the heat transfer medium loop by said second circulator.

Optionally, the engine further comprises an air intake for supplying air as said oxidant.

Optionally, the heat transfer medium is configured as a closed flow loop.

Optionally, the engine comprises helium as the heat transfer medium in the heat transfer medium loop. Neon or any other suitable fluid or gas may be used as the heat transfer medium.

Optionally, the fuel delivery arrangement is configured to supply hydrogen as said fuel.

According to a second aspect of the disclosure, there is provided a method of operating an engine, the engine comprising: a rocket combustion chamber for the combustion of fuel and oxidant; a compressor for supplying pressurized oxidant to said combustion chamber;
a first heat exchanger having an inlet and an outlet for cooling oxidant to be supplied to said compressor using a heat transfer medium before compression by said compressor;
a heat transfer medium loop for said cooling medium; wherein in a first mode of operation, the method comprises delivering heat transfer medium from the outlet of said first heat exchanger to the inlet of said first heat exchanger to control the temperature distribution in said first heat exchanger.

The first heat exchanger may have relatively higher and lower temperature stages. The proportion of heat transfer medium delivered from the outlet of the first heat exchanger to the inlet of the first heat exchanger may be adjusted to maintain the temperature in the cooler stage above a predetermined temperature. The predetermined temperature may be chosen to avoid the formation of frost on the first heat exchanger in use.

The heat transfer medium delivered from the outlet of the first heat exchanger may be mixed first with heat transfer medium which has been cooled by the fuel before delivery to the inlet of the first heat exchanger.

Optionally, the method comprises, in a second mode of operation, cooling the heat transfer medium delivered from the outlet of said first heat exchanger before delivering heat transfer medium to an intermediate point between the inlet and outlet of the first heat exchanger.

Optionally, in the second mode of operation, the flow rate of heat transfer medium in the first heat exchanger downstream of the intermediate point is twice the flow rate of heat transfer medium upstream of the intermediate point. This serves to limit the material temperature, which can decrease the engine cycle efficiency, but can more effectively control the temperature in the first heat exchanger.

Optionally, a first circulator is operated to deliver heat transfer medium to the inlet of the first heat exchanger and a second circulator is operated to deliver heat transfer medium from the outlet of the first heat exchange to the inlet or an intermediate point between the inlet and outlet of the first heat exchanger.

Optionally, a fuel is used to cool the heat transfer medium in a second heat exchanger before delivery to the first heat exchanger.

Optionally, the heat transfer medium is cooled in a third heat exchanger by the fuel before being delivered to the intermediate point between the inlet and outlet of said first heat exchanger.

Optionally, the oxidant is air and the fuel is hydrogen.

Optionally, the heat transfer medium is helium.

Optionally, the fuel is used to drive turbines associated with said first and second circulators. This allows the engine to be startable using fuel, for example hydrogen.

Optionally, in a third mode of operation, the heat transfer medium bypasses the first heat exchanger and the second circulator.

Optionally, in the third mode of operation, the oxidant is supplied as liquid oxygen.

Optionally, fuel is supplied to a pre-burner for pre-burning the fuel before delivery to the rocket combustion chamber.

Optionally, the exhaust from the pre-burner is used to warm heat transfer medium from the outlet of the first heat exchanger before delivery of heat transfer medium to a turbine to drive the compressor.

Optionally, in the third mode of operation, the first circulator is used exclusively to drive the heat transfer medium.

By selectively using one of the circulators, the energy requirements of the engine may be better managed.

Optionally, in the first mode of operation, up to 25% of the heat transfer medium from the outlet of the first heat exchanger is delivered to the inlet of said first heat exchanger.

According to a third aspect of the disclosure, there is provided a vehicle comprising an engine according to the first aspect with or without any optional feature thereof.

According to a fourth aspect of the disclosure, there is provided an aircraft, flying machine or aerospace vehicle comprising an engine according to the first aspect with or without any optional feature thereof.

BRIEF DESCRIPTION OF THE DRAWINGS

The present disclosure may be carried out in various ways and embodiments of the disclosure will now be described by way of example with reference to the accompanying drawings, in which.

DETAILED DESCRIPTION

Figure 1:
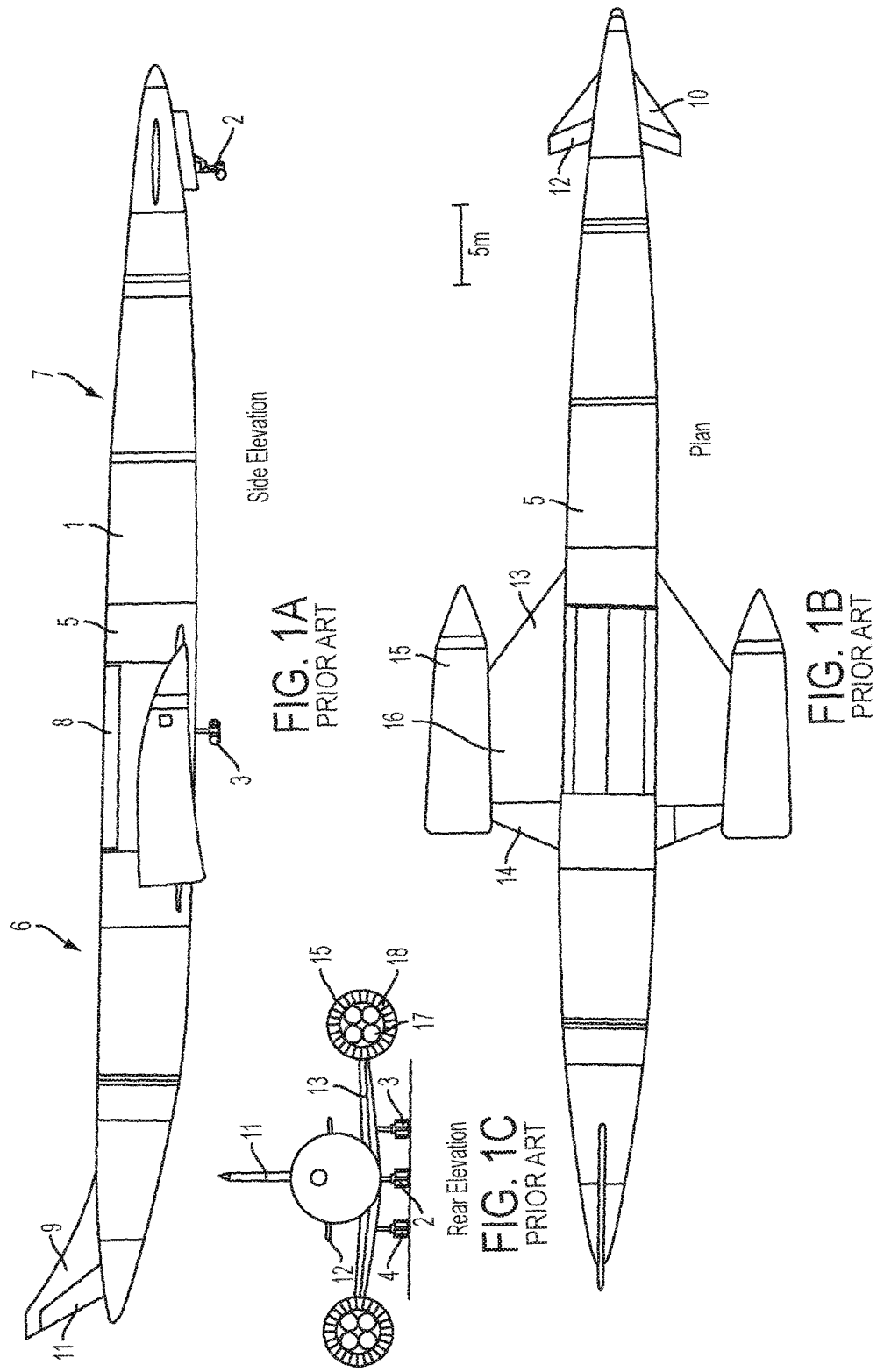
FIGS. 1A, 1B, and 1C show side, plan and rear elevations respectively of a single stage to orbit (SSTO) aircraft.
Figure 2:
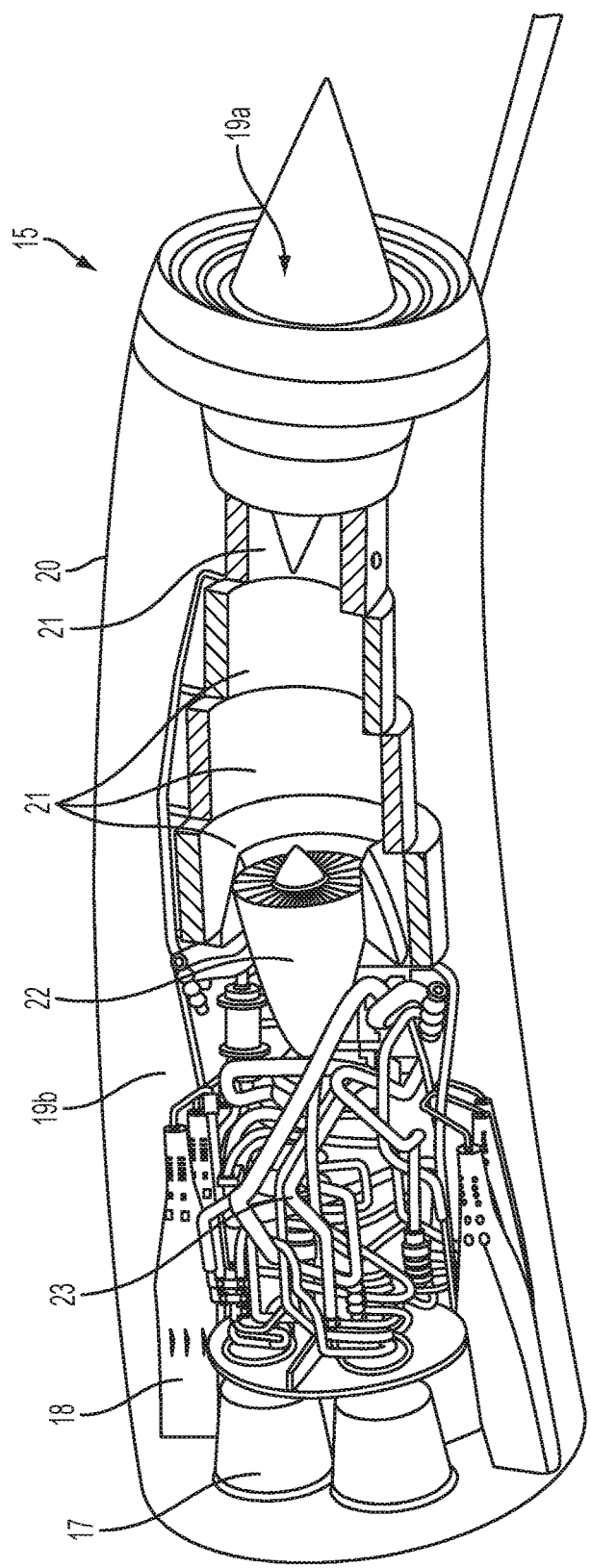
FIG. 2 shows a partial cross-section through a nacelle containing a prior art hybrid air breathing rocket engine module.

FIGS. 1A, 1B and 1C show a single stage to orbit (SSTO) aircraft 1 with a retractable undercarriage 2, 3, 4 having a fuselage 5 with fuel and oxidant stores 6, 7 and a payload region 8. A tail fin arrangement 9 and canard arrangement 10 with respective rudder 11 and canard 12 control surfaces are attached to the fuselage 5. Main wings 13 with elevons 14 are attached to either side of the fuselage 5 and each wing 13 has an engine module 15 attached to a wing tip 16 thereof. As shown in FIGS. 1C and 2, the rear of each engine module 15 is provided with four rocket nozzles 17 surrounded by various bypass burners 18.

FIG. 2 shows a prior art engine module 15. The prior art engine module 15 includes an air inlet 19a, a heat exchanger 21 comprising four parts, a turbo-compressor 22 and cycle flow conduits or channels 23. The engine module 15 is contained within a nacelle 20 which may be attached to an aircraft wing, such as an aircraft wing of an aircraft as shown in FIGS. 1A, 1B, 1C.

In an air breathing mode of operation of the engine module 15 within the Earth's atmosphere, part of the incoming air passing through the air inlet 19a passes through the heat exchanger 21 to the turbo-compressor 22 and another part is bypassed along bypass duct 19b to the bypass burners 18.

In a preferred embodiment, the prior art engine module is replaced with an engine module arranged and controlled as described below.

Figure 3:
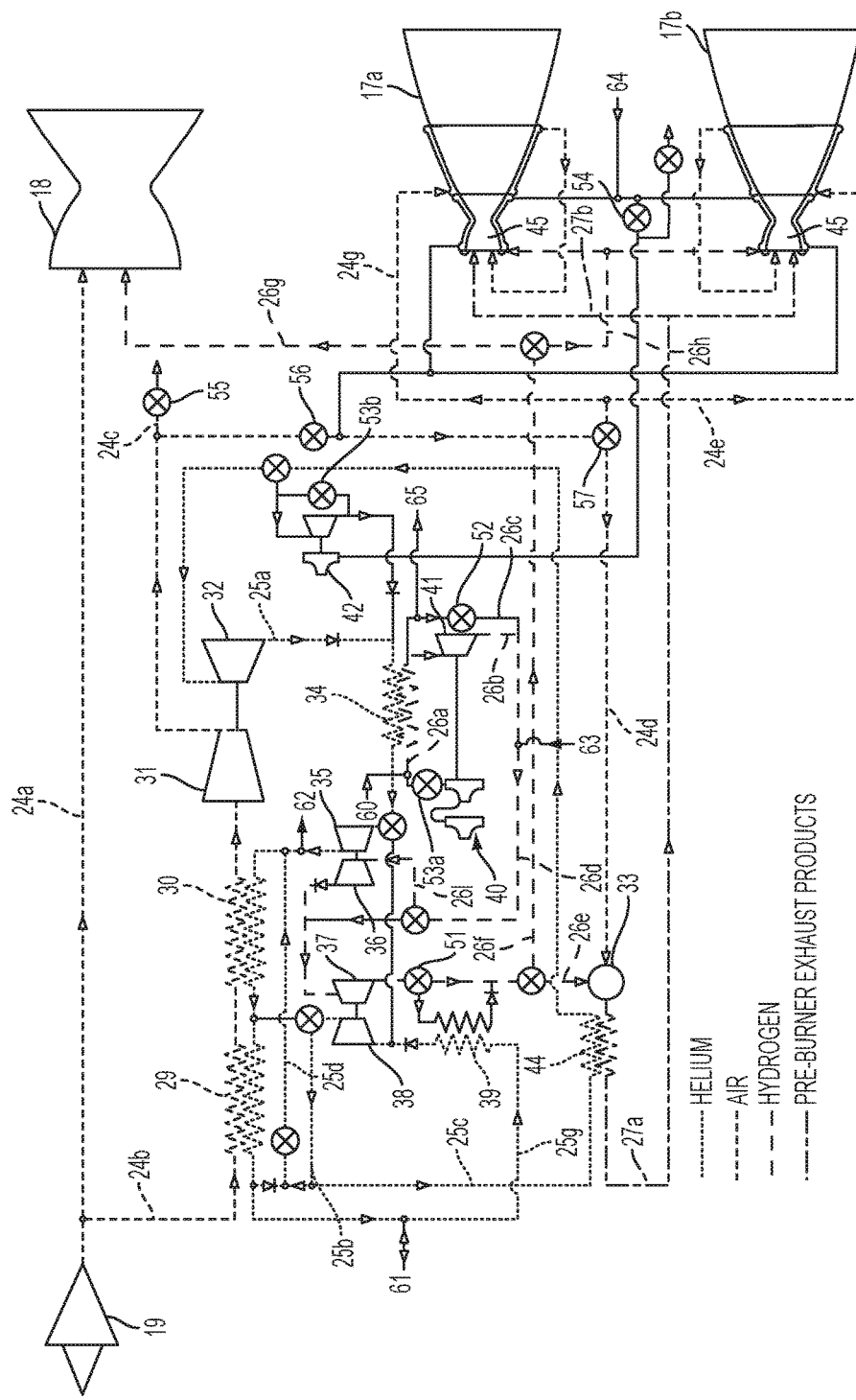
FIG. 3 shows a schematic cycle diagram of a hybrid air breathing rocket engine in an air breathing mode at a low Mach number, e.g. at a velocity typically below Mach 4.
Figure 4:
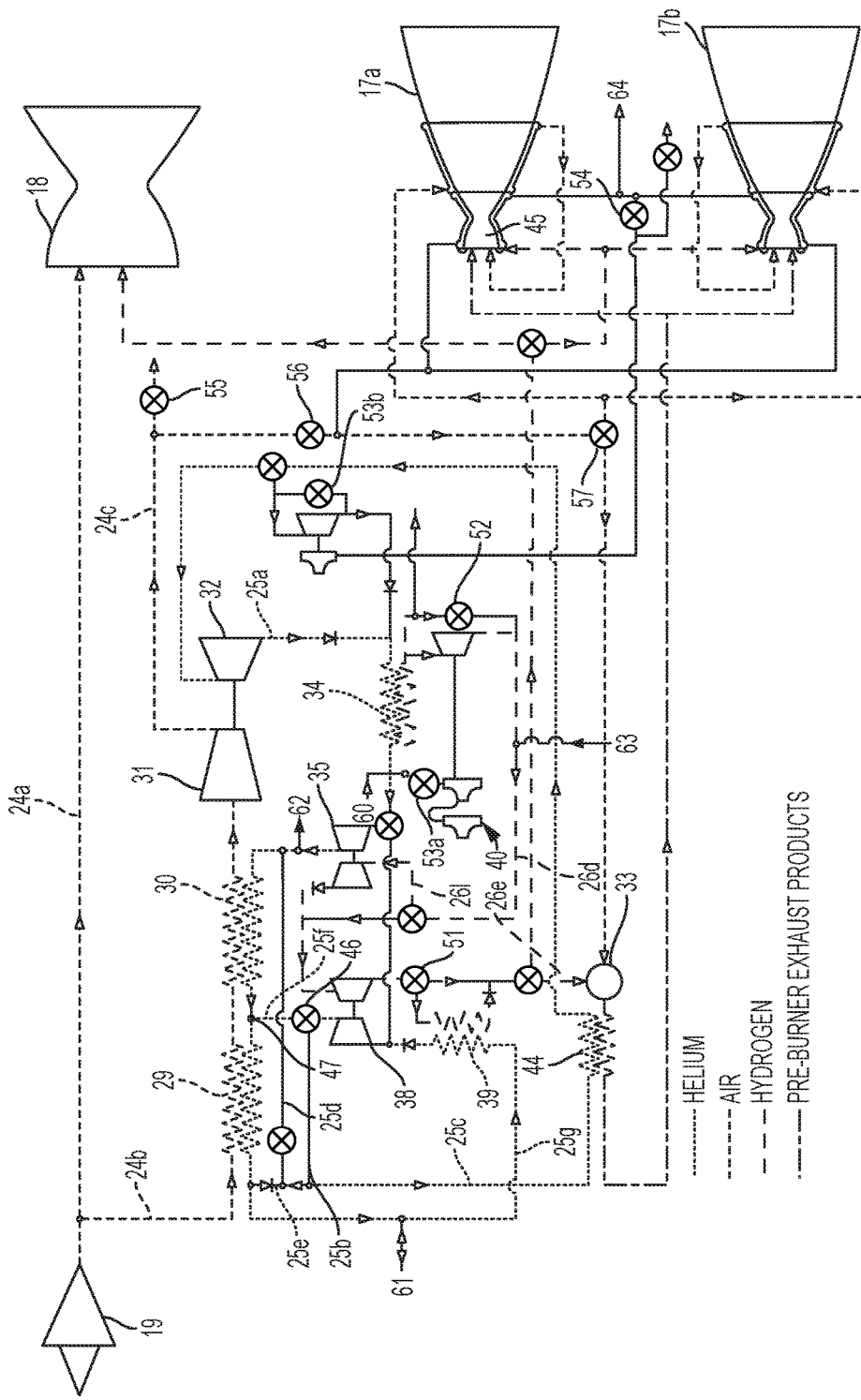
FIG. 4 shows a schematic cycle diagram of the hybrid air breathing rocket engine of FIG. 4 in an air-breathing mode at a velocity typically above Mach 4.
Figure 5:
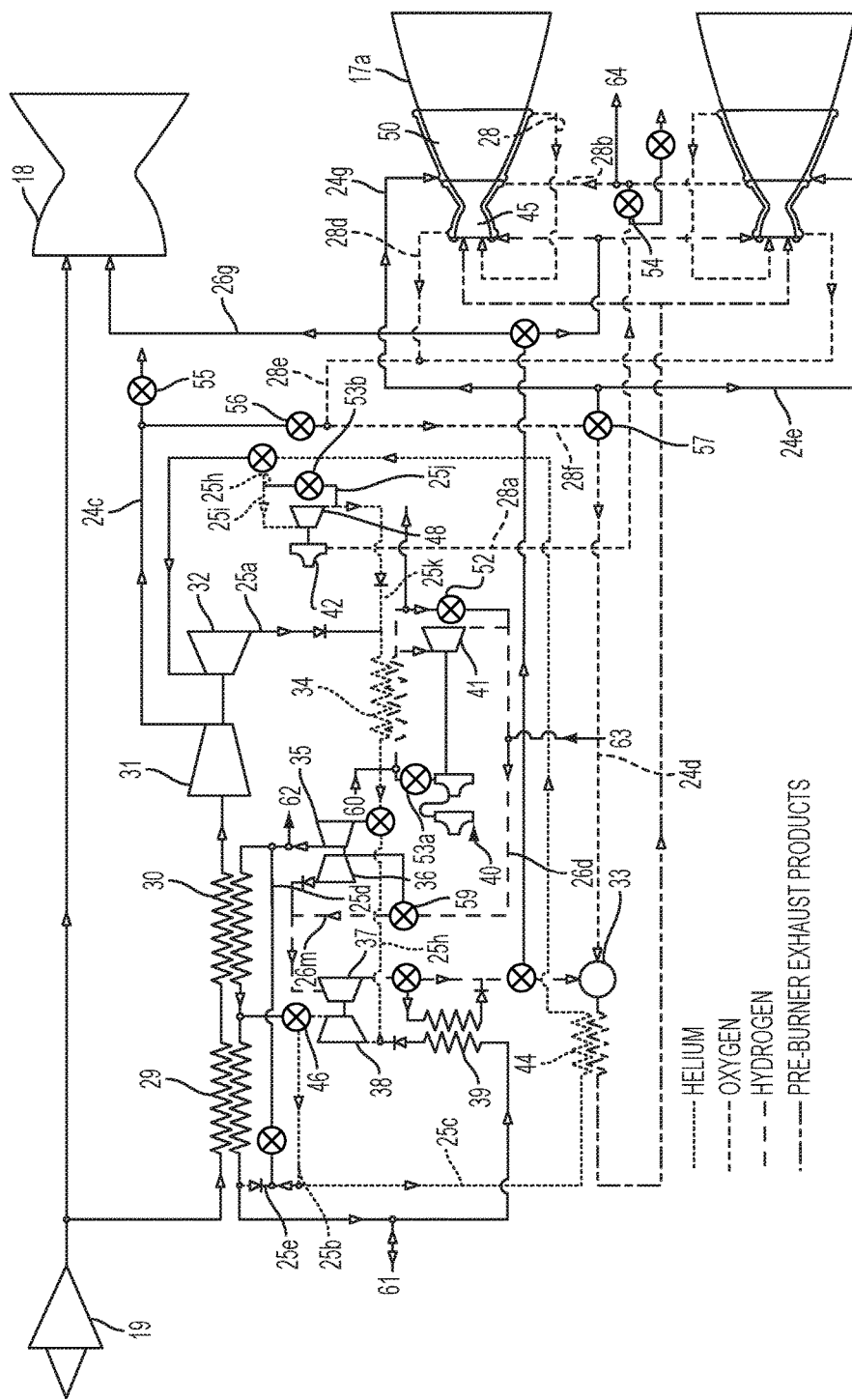
FIG. 5 shows a schematic cycle diagram of the hybrid air breathing rocket engine of FIGS. 3 and 4 operating in full rocket mode.

A schematic of an engine module or propulsion system is shown in FIG. 3. The engine module comprises an air intake 19. The air intake 19 may be axisymmetric such that when the aircraft is travelling at supersonic velocities, the air-intake 19 serves to decelerate the captured airflow to subsonic via oblique and normal shock waves. At high Mach numbers, e.g. Mach 5 and above, this deceleration can cause the air inlet temperature typically to increase to over 1250K. For the sake of clarity, reference numerals are not provided for every feature in each of FIGS. 3, 4 and 5. However, it should be understood that each of FIGS. 3, 4 and 5 shows the same engine in a different mode of operation and each engine comprises the same parts.

The air passing through the air intake splits into two flow paths. One of these flow paths 24a supplies air to a bypass burner 18 comprising a nozzle. At low flows of inlet oxidant, for example when the aircraft is travelling at low velocities, more air than needed is supplied by the inlet. The bypass burners may then be switched off, e.g. fuel is not supplied to the bypass burners. The bypass burners may be controlled down or up to match the oxidant, e.g. air supply to the engine. The bypass burners can provide additional thrust and improve the performance of the engine.

Another portion of the air from the air intake 19 passes via the other flow path 24b to a pre-cooler, which is needed to cool the compressed inlet air. In the embodiment, the pre-cooler comprises a first heat exchanger stage 29 and a second heat exchanger stage 30, although a pre-cooler with any number of heat exchanger stages is envisaged.

Following the passage of the air through the heat exchanger stages 29, 30, the air passes through compressor 31 which is driven by turbine 32 as described in further detail below. The compressor is chosen to provide a predetermined compression ratio dependent on the performance requirements of the engine. In the embodiment, the compressor may typically have a compression ratio of 150:1 such that the intake air is compressed to around 145 bar.

A portion of the compressed air is passed to a pre-burner 33 via flow path 24d. A further portion of the compressed air passes through flow path 24g to the combustion chamber 45 of a rocket engine with nozzle 17a. Another portion of the compressed air passes through flow path 24e to the combustion chamber 45 of a rocket engine with nozzle 17b. This air may also be used to cool the combustion chambers 45 and/or nozzles 17a and 17b. The proportion of air delivered to the pre-burner 33 and combustion chambers 45 may be adjusted and controlled to meet the performance requirements of the engine.

Typically, such an engine will be provided with a plurality of combustion chambers 45 and associated rocket nozzles 17a, 17b. In the schematic, two rocket chambers 45 with associated nozzles 17a, 17b are shown.

A typical aircraft or vehicle may include four combustion chamber/nozzle assemblies arranged in a nacelle. However, any number of chamber/nozzle assemblies may be provided in order to provide the required thrust to the vehicle.

Although only one of the rocket chamber 45 and nozzle assemblies 17a, 17b will be highlighted when describing the operation of this engine, it should be understood that any other rocket chamber/nozzle assembly provided may operate in a similar or identical manner and that the each rocket chamber/nozzle assembly will receive a proportion of the fuel and oxidant in order to operate and provide thrust to the vehicle.

In an aircraft with two nacelles, each comprising four combustion chamber/nozzle assemblies, the combustion chamber/nozzle assemblies can be configured to behave as a single engine during air breathing ascent and as two twin chamber rocket engines during rocket ascent. This can serve to increase mission reliability and minimize the volume of the engine installation.

In the embodiment, the combustion chambers 45 may be lined using liners comprising, for example, an alumina dispersion hardened copper such as GLIDCOP AL-20® or other suitable thermally conducting material. This can reduce the thermal stress in the combustion chambers. Such liner material may be employed in view of the high wall temperature that can be reached in the combustion chamber 45 during the air breathing operating mode. In this mode of operation, the combustion chamber 45 may be film-cooled using hydrogen, using a separate inlet to the combustion chamber 45. Compressed air or liquid or low temperature gaseous oxygen may be supplied to cooling channels in the combustion chamber or nozzle skirt. Typically, the air or liquid oxygen is supplied towards the intersection between the combustion chamber and skirt, where the air or oxygen flows upstream within channels in the combustion chamber and downstream within channels in the skirt.

The combustion chamber 45 is used to combust compressed air and hydrogen fuel in air-breathing mode and oxygen from on-board liquid oxygen stores and hydrogen in full rocket mode.

During full rocket operation, i.e. when liquid oxygen is used as oxidant, the combustion chamber 45 may be cooled with the liquid oxygen such that it operates at 800K or below. The oxygen typically leaves the liner at about 210K. Such a temperature is useful in that it enables the same combustion chamber injectors to be employed in both engine modes, i.e. air breathing and rocket modes. The oxygen pressure drop in the liner is approximately 220 bar.

In the embodiment, the nozzles comprise a tubular cooled skirt with a final radiation cooled extension, for example of SEP-CARBINOX® (a material comprising a carbon fiber reinforcement and silicon carbide matrix). This seeks to enable the nozzles to survive external air flow heating during re-entry into the atmosphere, when no coolant is available for engine cooling. In the embodiment, the cooled tubular skirt is made from high temperature alloys, such as INCONEL®, which is a family of austenitic nickel-chromium-based superalloys, which may comprise a plurality of tubes.

During re-entry, the hydrogen loop is driven idly, at inlet 63, from the hydrogen tank. This serves to draw the helium around the helium loop to prevent over-heating of the pre-cooler.

In the embodiment, during air breathing mode, the skirt 50 is cooled by the high pressure air destined for the combustion chamber. In rocket mode, the liquid oxygen from flow paths 28a and 28b first passes through the combustion chamber liner and then a part of the vaporized oxygen destined for the combustion chamber 45 passes through the tubular skirt before entering the injector via flow path 28.

The pre-cooler 29, 30 is used to cool the inlet air. The first stage 29 of the heat exchanger and the second stage of the exchanger 30 correspond to higher and relatively lower temperature portions respectively.

In the embodiment, the pre-cooler 29, 30 is a high performance heat exchanger which uses high pressure gaseous helium in a closed loop as a cooling medium. The helium loop is described in further detail below.

A suitable heat exchanger may be configured as a counter flow heat exchanger with a matrix of cooling channels or tubes of less than 1 mm in diameter with thin walls of typically 20-30 micrometers. A large number e.g. 300,000 to 600,000 of such tubes are nested and arranged in involute spirals in each heat exchanger in order to provide the necessary performance. The tubes may follow a spiral path from the inlet to the outlet with the tubes extending either radially or axially. In the embodiment, the pre-cooler is configured to enable cooling of the inlet air from temperatures of 1250K to a temperature of about 125K.

The engine is configured to operate using air for take-off. The engine is started by auxiliary turbo pumps driven from the vehicle's internal gaseous propellant supply system.

Prior to engine start, a closed helium loop designated 25a through 25g is filled with helium. The helium loop may be topped up or vented, for example due to expansion of the helium, at inlet line 61. To prevent cavitation of the oxygen pumps, helium may be supplied via stream 62 to pressurize the oxygen tanks. The pre-cooler is initially isolated in the helium loop and has a resting pressure of approximately 140 bar, while the remaining helium loop resting pressure is approximately 40 bar. The combustion chamber 45 is isolated from the supply of oxidant and fuel at this time.

The start turbo pumps (not shown) supply liquid hydrogen (at inlet line 60 shown in FIG. 3) at a pressure of 60 bar and liquid oxygen at 130 bar (at inlet line 64) from the vehicle's main tanks. The hydrogen enters heat exchanger 34 downstream of valve 53a, which at this stage is closed. Oxygen enters the thrust chamber cooling circuit downstream of valve 54, which at this stage is closed.

The engine runs up while venting air delivered from compressor 31 via flow path 24c through valve 55, and when the helium circulator delivery supply reaches 140 bar, the pre-cooler is de-isolated bringing the pre-cooler 29, 30 into the helium loop. At the same time, valve 56 begins to open to deliver air to pre-burner 33 and combustion chambers 45.

When the hydrogen pump delivery reaches 60 bar, valve 53a opens and the hydrogen start supply is backed off. In addition, when the compressor air delivery reaches 130 bar, the oxygen start supply is backed off. To prevent cavitation in the hydrogen pumps, hydrogen downstream of heat exchanger 34 may be delivered along stream 65 to pressurize the hydrogen tanks.

Boost pumps may be provided for both the oxygen and hydrogen tanks to ensure the main hydrogen and oxygen delivery pumps can operate effectively.

Concurrently, valve 57 admits air to the combustion chamber 45 for combustion of fuel and film cooling of the combustion chamber and/or nozzles. The engine has now reached the main stage of operation in air-breathing mode.

Helium is driven in the helium loop by circulator 35. Although the circulator will be chosen depending upon the performance requirements of the engine, in the embodiment, the circulator 35 comprises a single stage centrifugal compressor driven by a two-stage hydrogen turbine 36. The circulator 35 typically operates at approximately 64,000 rpm. The construction is similar to the hydrogen turbo-pump 40, 41 described below, with a similar power of 19 MW maximum.

In the first air-breathing mode of operation as shown in FIG. 3, generally below an altitude of 10 km, the helium is driven by the circulator 35 through, in sequence, the second heat exchanger stage 30 and first heat exchanger stage 29 of the pre-cooler such that the heat exchanger pre-cooler operates in counter flow to the flow of inlet air.

Following the pre-cooler, the helium then passes through re-circulator 38 before passing along flow path 25b where the helium path is split between a first flow path 25c and a second flow path 25d. The first flow path 25c passes through heat exchanger 44 for pre-burner 33, where the temperature of helium increases before continuing on a loop through turbine 32 which drives compressor 31 (turbine and compressor together forming a turbo compressor) used to compress the intake air.

While in this first mode of air-breathing operation, typically at a velocity below Mach 4 and below an altitude of 10 km, helium passes through heat exchanger 39 arranged before the re-circulator 38. However, the helium is not cooled in this heat exchanger 39 by the hydrogen, as the hydrogen bypasses the heat exchanger via bypass 51.

Following turbine 32 of the turbo compressor, helium passes through heat exchanger 34 where it is cooled by hydrogen to around 44K delivered by liquid hydrogen pump 40 via flow path 26a. The helium then returns to the start of the helium loop at circulator 35.

Although the helium re-circulator 38 may be chosen depending on the performance requirements of the engine, in the embodiment, the helium re-circulator is a fan which drives the cooling loop flow. The unit may typically comprise a single stage axial flow fan 38 which is driven by a single stage hydrogen impulse turbine 37. The unit may typically operate at a maximum speed of 57330 rpm.

In the embodiment, as with the main helium circulator 35, there are two re-circulators 38 per nacelle for reliability during rocket operation. The operating temperatures are relatively low, e.g. 630K helium and 577K hydrogen.

After the re-circulator 38, the second helium flow path 25d returns helium to the pre-cooler 29, 30 at a point between the second heat exchanger stage 30 and the circulator 35. This allows the helium from the pre-cooler outlet to be mixed with helium which has been pre-cooled by the hydrogen stream in heat exchanger 34.

Each nacelle contains two hydrogen turbo pumps 40 to feed hydrogen in the engine. Although the hydrogen pump is chosen depending upon the performance requirements of the engine, in the embodiment, each pump comprises two impeller stages with a power level of 12.4 MW in air-breathing mode (20.4 MW in rocket mode). In air breathing mode, the pumps typically operate at 69,000 rpm with a delivery pressure of 310 bar.

A hydrogen turbine 41 receives high pressure hydrogen from heat exchanger 34 which has been raised in temperature to around 650K and 310 bar by the helium, this hydrogen having been heated by the helium leaving turbine 32 of the turbo compressor. The inlet to the hydrogen turbine 41 is approximately 310 bar at 660$k$ in air breathing mode (330 bar at 777K in rocket mode at 100% thrust). The hydrogen pump output 40 is controlled by a means of a bypass valve 52 on bypass flow path 26c on the hydrogen turbine 41. With a generally similar hydrogen pump pressure requirement in both air-breathing and rocket modes, additional compression stages, which would otherwise not be fully utilized in air-breathing mode are not required.

Following turbine 41, the hydrogen stream follows flow paths 26b, 26d and 26l to turbine 36, this turbine 36 driving circulator 35 as described above. Following turbine 36, the hydrogen then passes through turbine 37 which drives re-circulator 38 as described above. Following turbine 37, a portion of the hydrogen passes to pre-burner 33 via flow path 26e. A portion of the hydrogen passes along flow path 26f, where a proportion passes to the rocket combustion chamber 45 via flow path 26h and a proportion of the hydrogen passes to bypass burner 18 via flow path 26g.

In this first mode of operation of the engine, liquid oxygen is not needed as an oxidant for the rocket chamber. Instead, the rocket operates in an air breathing mode. Air-breathing enables an aircraft which comprises such an engine to take off without needing to use a separate source of oxygen and without an additional propulsion means, which has significant weight advantages as there is a reduced requirement to carry an additional oxidant on the aircraft.

The pre-burner 33 exhaust is used to pre-heat the helium via heat exchanger 44 before the helium passed to turbine 32 to drive the air intake compressor 31. The pre-burner 33 is controlled to maintain a constant upper cycle temperature of helium, in the embodiment typically around 1180K independent of the Mach number of the aircraft while in air-breathing mode.

The pre-burner 33 burns hydrogen with air fed along flow path 24d. The pre-burner outlet gases flow along flow path 27a before being fed into the rocket combustion chamber 45 via flow path 27b.

Although the pre-burner 33 may be chosen depending on the performance requirements of the engine, in the embodiment, the pre-burner 33 and heat exchanger 44 form an integral unit comprised of a hydrogen rich combustor and shell-and-tube heat exchanger with a single floating tube sheet.

The pre-burner 33 operates over a very wide range of flows and mixture ratios during air breathing mode and in the change to rocket mode. Typically, the maximum pre-burner combustion temperature is 1855K while the maximum combustion gas exit temperature from heat exchanger 44 is 1027K. The structure of the unit and the exhaust ducting therefrom are uncooled but have insulating liners.

All of the hydrogen destined for the main combustion chambers passes through the pre-burner 33. Sufficient oxidizer (air in air breathing, gaseous oxygen in rocket mode) is submitted to the pre-burner 33 to raise the helium temperature at the exit from the pre-burner heat exchanger 44 to the required value (in the embodiment, 1180K in air breathing, 820K in rocket mode, where only the re-circulator 38 and turbine 48 for the liquid oxygen pump need to be driven). The remaining oxidizer is added in the main combustion chambers.

Each nacelle of the vehicle contains two pre-burners 33 for reliability in rocket mode operation, although only one is shown in the Figures. However, in the embodiment, both pre-burners 33 need to operate in air breathing mode in order to allow the helium flow to drive the turbine 32.

The pre-burner outlet gases complete their combustion in the rocket combustion chamber 45 along with the hydrogen fuel and expand through the propelling nozzles 17a in order to provide thrust to the aircraft. In the embodiment, the rocket engine combustion chamber 45 operates at 103 bar and provides 500 KN of vacuum thrust.

FIG. 4 shows operation of the engine in a second mode of operation typically over velocities above Mach 4, but before the rocket operates using liquid oxygen as the oxidant.

In contrast to the first mode of operation, in this second mode of operation, following its passage through re-circulator 38, the helium enters the pre-cooler at a junction 47 between the second heat exchanger stage 30 and the first heat exchanger stage 29.

In this mode of operation, the helium, as with the first mode of operation, flows along flow path 25g to heat exchanger 39 before passing to re-circulator 38. In addition, helium also passes from the pre-cooler along flow path 25e to the pre-burner heat exchanger 44 without first passing through the re-circulator 38.

Following the pre-burner heat exchanger 44, the helium continues as in the first mode to pass through turbine 32 to drive air compressor 31 and the hydrogen heat exchanger 34 before passing to circulator 35 and then the second stage 30 of the pre-cooler.

The hydrogen can therefore be seen to act as a heat sink for a heat engine, which uses the high temperature inlet air as its heat source via the helium loop. This means that a significant part of the heat of the inlet air can be converted to work, e.g. to drive the turbine of the turbo compressor.

In this mode of operation, the flow of hydrogen is controlled using valve 51 such that the hydrogen passes through the heat exchanger 39 arranged in the helium loop before the re-circulator 38. In this way, helium is additionally cooled via the hydrogen fuel before proceeding to junction 47. The flow of helium to the junction 47 is controlled via the valve 46. In this mode, the air intake and cycle is the same as in the first mode of operation.

By providing helium from the pre-cooler back to the pre-cooler inlet in the first mode as described above without heat rejection to the hydrogen fuel at heat exchanger 39, the helium can be used to regulate the temperature of the second heat exchanger stage 30 of the pre-cooler by mixing it with the pre-cooled helium from the circulator 35 in suitable proportions to obtain the required temperature of helium at the pre-cooler inlet.

At higher velocities, typically above Mach 4, the second mode of operation as described above is employed. In this second mode, the cooling requirements in the first heat exchanger stage 29 are increased, with the helium being pre-cooled after the pre-cooler in heat exchanger 39 before flowing to junction 47 between the two heat exchanger stages 29, 30.

By employing these first and second air-breathing modes, the temperature distribution in the pre-cooler may be better controlled, and ideally the radial temperature difference is kept constant throughout ascent. This can serve to assist in the control of frost formation on the pre-cooler up to altitudes of approximately 10 kilometers and allows the frost control system to operate more efficiently.

The amount of helium to be re-circulated is dependent on the flight condition and the temperature and humidity of the atmosphere. The amount of recirculation is a maximum at take-off, e.g. as described in relation to the first mode of operation where the recirculated helium is passed again through the entire pre-cooler. The amount of re-circulated helium falls with altitude, such as in the second mode of operation.

Recirculation can reach 25% of the net flow in hot-humid conditions at takeoff, but falls rapidly to a few percent by 5000 m and zero by 10,000 m when frost control is no longer needed as air is not used as the oxidant.

In the embodiment, the re-circulator power is relatively low compared with the circulator 35, typically in the order of 24% of the circulator power.

It is also theoretically possible to control the pre-cooler temperature distribution by bypassing helium from the circulator. However, the engine performance can be affected with reduced thrust due to high compressor entry temperature and reduced air mass flow.

At higher velocities, the engine can operate in a third mode as shown schematically in FIG. 5. In this mode, the engine operates more conventionally as a rocket engine. In this mode, the oxygen used in the rocket chambers 45 is provided by the liquid oxygen pumps 42. A proportion of the liquid oxygen is provided to the pre-burner along flow path 24*d*.

The transition from air breathing to rocket operation is achieved with the engine under continuous operation and low thrust at the end of the air breathing trajectory pull-up. Initially, the rocket mode begins by running down the pre-burner 33 temperature, running up the liquid oxygen pump 42 and venting the oxygen while still operating the combustion system on air. The next stage is to substitute oxygen for air by admitting liquid oxygen to the combustion chamber cooling system to vaporize it, and venting the air overboard.

During the final phase of transition to rocket mode, the turbo-compressor 31, 32 runs down while the helium flow bypasses the main circulator 35 and flows directly to the re-circulator 38. The engine at this stage is now operating in rocket mode at approximately 50% of full thrust. The engine is finally throttled up to 100% thrust for the rocket ascent.

Typically, the net thrust/fuel flow varies from 26,000 m/s at take-off to approximately 16,000 m/s at Mach 5. The equivalence ratio, i.e. the actual fuel-to-air ratio to the stoichiometric fuel-to-air ratio, of the un-installed engine is approximately 2.8. In operation, the combustion chamber operates substantially at stoichiometric fuel-to-air/oxidant ratios in air-breathing mode.

In this third mode of operation, the helium does not pass through the first and second stages 30, 29 of the pre-cooler as no air pre-cooling is required. Rather, the helium passes through re-circulator 38 and at valve 46, all of the helium flows along flow path 25*b* and then flow path 25*c* through the pre-burner heat exchanger 44. The helium then passes around the loop via flow paths 25*h* and 25*i* to turbine 48 to drive the liquid oxygen pump 42 which provides oxidant to the rocket combustion chamber 45. In this mode, the helium does not pass through the turbine 32 of the turbo compressor. Following the turbine 48, the helium then passes through the hydrogen heat exchanger 34 via flow path 25*k* before passing directly to re-circulator 38, i.e. bypassing circulator 35. The re-circulator 38 has a lower power than the main helium circulator 35 and this reduced power consumption may be exploited in the rocket ascent mode of the engine.

The engine is provided with two oxygen turbo-pumps 42 in each engine in a nacelle. In the embodiment, the inlet pressure may be of the order 4 bar supplied by the vehicle tank-mounted boost pumps. The oxygen pumps have a typical power of 13 MW to produce a nominal pump delivery pressure of 400 bar.

In the embodiment, the helium turbine 48 comprises a single stage. Due to the helium circuit characteristic being fixed by the air breathing phase it provides far in excess of the oxygen pump demand. This turbine 48 may therefore be arranged in series with a large choke, to drop the pressure ratio to 1.3, and in parallel with a large bypass 53*b* via flow path 25*j* to drop the design flow to 20 kg/s. Because of these conditions, the design constraints on the turbine are minimal and can be used to minimize its mass. The turbine 48 typically has an inlet temperature of 820K.

A proportion of the oxygen is also supplied via flow paths 28*a*, 28*b*, 28*d*, 28*e*, and 28*f* to the pre-burner 33 along flow path 24*d*. In this mode of operation, hydrogen is pumped through the heat exchanger 34 through turbine 41 and flow path 26*d*, bypassing turbine 36 via flow path 26*m* using valve 59 before passing to turbine 37 and passing directly to pre-burner 33 without passing through the heat exchanger 39 as in this mode, no additional cooling of the helium is required.

The liquid hydrogen is typically stored cryogenically on the vehicle at, or below, 20K and would typically be delivered from a fuel pump at about 200 bar and 35K.

In transition from air breathing to rocket mode, the loop power being delivered to the turbines 32, 48, 36, 37 drops from 227.4 MW to 33.4 MW, i.e. to 14.7% of the maximum power level. The increase in hydrogen mass flow by about 50% in rocket mode relative the air breathing mode, coupled with the lower power requirements described above, allows the re-circulator turbine 37 to drive the helium loop in rocket mode rather than the main circulator 35.

The engine is shut-down by closing the oxidizer supply valves 54, 56 as well as the hydrogen supply valve 53*a* while controlling the pre-burner temperature using valve 57.

During shut-down the pre-cooler is isolated and the main loop is allowed to vent to resting pressure, phasing the hydrogen pressure so as not to overstress heat exchanger 34. The pre-cooler is then vented to its resting pressure and the propellant lines are purged with helium.

Various modifications may be made to the described embodiment(s) without departing from the scope of the invention as defined by the accompanying claims.

The invention claimed is:

1. An engine comprising:
   a rocket combustion chamber for the combustion of fuel and oxidant;
   a compressor for supplying pressurized oxidant to the rocket combustion chamber;
   a first heat exchanger having an inlet and an outlet arranged for cooling oxidant to be supplied to the compressor using a heat transfer medium before compression by the compressor, the first heat exchanger having a first heat exchanger stage and a second heat exchanger stage;
   a heat transfer medium loop for the heat transfer medium;
   a fuel delivery arrangement for delivering fuel;
   a second heat exchanger arranged for cooling of the heat transfer medium by fuel delivered by the fuel delivery arrangement;
   a first circulator for circulating the heat transfer medium around the heat transfer medium loop and delivering the heat transfer medium to the inlet of the first heat exchanger;
   a second circulator arranged downstream of the outlet of the first heat exchanger,
   the engine being configured to operate in a first operating mode, in which the second circulator is configured to deliver the heat transfer medium from the outlet of the first heat exchanger to the inlet of the first heat exchanger, the heat transfer medium returning to the inlet of the first heat exchanger at a point between the second heat exchanger stage and the first circulator;
   a third heat exchanger, the third heat exchanger being arranged for cooling the heat transfer medium from the outlet of the first heat exchanger using the fuel,
   the engine being configured to operate in a second operating mode, in which the second circulator is configured to deliver heat transfer medium from the outlet of the first heat exchanger to an intermediate point between the inlet and the outlet of the first heat exchanger after cooling by the third heat exchanger, wherein the first heat exchanger has a junction between the first and second heat exchanger stages with a valve at the outlet of the second circulator to switch the heat transfer medium from the second circulator to the junction, or to a flow path that bypasses the first heat exchanger,
   wherein said bypass flow path from the second circulator splits into a first flow path and a second flow path, said second flow path returning a portion of the heat transfer medium to a point between the second heat transfer stage and the first circulator, said first flow path providing a remaining portion of the heat transfer medium to a fourth heat exchanger configured for heating said remaining portion of the heat transfer medium; and
   a bypass that can be employed for bypassing fuel past the third heat exchanger in the first operating mode, including a bypass valve located upstream of the third heat exchanger.

2. An engine according to claim 1, wherein the engine further comprises a turbine, the turbine being configured to be driven using a portion of the heat transfer medium from the outlet of the first heat exchanger for driving the compressor.

3. An engine according to claim 2, wherein the fourth heat exchanger is configured for heating the heat transfer medium before delivery to the turbine.

4. An engine according to claim 3, wherein the engine further comprises a pre-burner configured to pre-heat fuel before delivery to the rocket combustion chamber, an exhaust from the pre-burner being connected to the fourth heat exchanger for heating of the heat transfer medium.

5. An engine according to claim 1, wherein the engine further comprises an oxidant store, the engine being configured to operate in a third operating mode, wherein the oxidant is supplied from the oxidant store.

6. An engine according to claim 5, wherein the engine is configured such that the heat transfer medium bypasses the first heat exchanger.

7. An engine according to claim 6, wherein the engine is configured such that the heat transfer medium bypasses the first circulator and is driven in the heat transfer medium loop by the second circulator.

8. An engine according to claim 1, wherein the engine further comprises an air intake for supplying air as the oxidant.

9. An engine according claim 1, wherein the heat transfer medium loop is configured as a closed flow loop.

10. An engine according to claim 1, wherein the engine comprises helium as the heat transfer medium in the heat transfer medium loop.

11. An engine according to claim 1, wherein the fuel delivery arrangement is configured to supply hydrogen as the fuel.

12. An aircraft or aerospace vehicle comprising an engine according to claim 1.

* * * * *